(12) United States Patent
Rosenboom

(10) Patent No.: US 6,477,967 B2
(45) Date of Patent: Nov. 12, 2002

(54) SEED PLANTER

(76) Inventor: Lyn A. Rosenboom, 841 E. 3000 North Rd., Clifton, IL (US) 60927

( * ) Notice: Subject to any disclaimer, the term of this patent is extended or adjusted under 35 U.S.C. 154(b) by 0 days.

(21) Appl. No.: 09/847,760

(22) Filed: May 2, 2001

(65) Prior Publication Data

US 2002/0043200 A1 Apr. 18, 2002

Related U.S. Application Data

(60) Provisional application No. 60/201,836, filed on May 3, 2000.

(51) Int. Cl.[7] .................................................. A01C 7/00
(52) U.S. Cl. ....................................... 111/177; 221/217
(58) Field of Search ................................. 111/177, 178, 111/174, 170, 191, 194, 161, 162, 164; 221/217, 210, 222, 278, 277

(56) References Cited

U.S. PATENT DOCUMENTS

| | | | |
|---|---|---|---|
| 3,022,755 A | * | 2/1962 | Roepke |
| 3,951,306 A | * | 4/1976 | Ernst |
| 3,999,690 A | | 12/1976 | Deckler ..................... 222/194 |
| 4,029,028 A | * | 6/1977 | Griffiths |
| 4,296,695 A | * | 10/1981 | Quanbeck |
| 5,542,364 A | * | 8/1996 | Romans |
| 6,173,664 B1 | | 1/2001 | Heimbuch ................... 111/178 |
| 6,216,615 B1 | * | 4/2001 | Romans |

FOREIGN PATENT DOCUMENTS

| | | | | |
|---|---|---|---|---|
| DE | 2408322 | * | 9/1975 | .................. 111/177 |
| DE | 3602125 | * | 7/1987 | .................. 111/177 |
| SU | 1001885 | * | 3/1983 | .................. 111/177 |

* cited by examiner

*Primary Examiner*—Victor Batson
(74) *Attorney, Agent, or Firm*—Philip L. Bateman

(57) ABSTRACT

A seed planter is pulled behind a tractor and deposits seeds into an underlying trench in soil. The seed planter contains (a) a seed hopper for holding a quantity of seeds; (b) a seed meter for metering the flow of seeds to be planted which drops seed into a seed conveyor; (c) a trench former for forming an underlying trench in the soil; (d) a seed conveyor comprising a pair of rotating seed placement discs located behind the trench forming discs for conveying seeds from the seed meter into the trench at regular intervals, the seed placement discs having resilient annular rings attached to the perimeter of their inner facing sides, the rings being compressed together during a portion of their rotation below the seed meter and being spaced apart at a later portion of their rotation, such that a seed dropping from the seed meter is secured between the compressed rings and is then released to drop into the underlying trench as the rings separate; and (e) a trench closer located behind the seed placement discs for closing the trench and compacting the soil over the planted seeds.

15 Claims, 3 Drawing Sheets

SEED PLANTER

CROSS-REFERENCE TO RELATED APPLICATION

This application claims the benefit of U.S. Provisional Application Ser. No. 60/201,836, filed May 3, 2000.

FIELD OF THE INVENTION

This invention relates to seed planters. More particularly, this invention relates to seed planters having seed placement discs for placing the seeds into the soil at accurate intervals.

BACKGROUND OF THE INVENTION

Seed planters are used in modern high-production farm operations to create a trench in the soil, deposit seeds into the bottom of the trench at accurate intervals, and then cover the trench. Seed planters are pulled behind a tractor and have a plurality of individual planter units arranged side-by-side so a plurality of parallel rows can be simultaneously planted. One type of seed planters is especially suited for planting relatively large seeds such as corn and soybeans.

A conventional corn and soybean seed planter is disclosed in Deckler, U.S. Pat. No. 3,999,690, issued Dec. 28, 1976, which is incorporated by reference. Each individual seed planter unit contains a seed hopper for holding a quantity of seeds, a seed meter for metering the seed, and a seed conveyor consisting of a drop chute through which the seeds pass from the meter to the soil. Each seed planter unit also contains a pair of trench forming discs in front of the drop chute and a soil packing wheel behind the drop chute. The drop chute is a hollow tube or rectangular duct having a length of about twenty-four inches. The seeds fall down through the drop chute by gravity. All seeds tumble and fall down the chute, but especially those with irregular, non-spherical shapes such as corn. The tumbling of the seeds creates some differences in the time it takes the seed to drop through the drop chute. These differences, in turn, cause the interval between planted seeds to vary somewhat. The variance is increased as the speed of the tractor pulling the planter increases. The spacing of seeds is extremely important because it has a major effect on crop yield. To keep the seed interval variance at an acceptable range, the maximum speed for planting corn with a conventional seed planter is about five miles per hour.

Accordingly, a demand exists for a seed planter that can plant the seeds at more accurate intervals so that the speed of the tractor can increase.

SUMMARY OF THE INVENTION

The general object of this invention is to provide an improved seed planter. A more particular object is to provide an improved seed planter that places seeds into an underlying trench at accurate intervals and that enables the seed planter to be pulled at greater speeds through the field.

I have invented an improved seed planter of the type that is pulled behind a tractor and that deposits seeds into an underlying trench in soil. The seed planter comprises: (a) a seed hopper for holding a quantity of seeds; (b) a seed meter for metering the flow of seeds to be planted which drops seed into a seed conveyor; (c) a trench former for forming an underlying trench in the soil; (d) a seed conveyor comprising a pair of rotating seed placement discs located behind the trench forming discs for conveying seeds from the seed meter into the trench at regular intervals, the seed placement discs having resilient annular rings attached to the perimeter of their inner facing sides, the rings being compressed together during a portion of their rotation below the seed meter and being spaced apart at a later portion of their rotation, such that a seed dropping from the seed meter is secured between the compressed rings and is then released to drop into the underlying trench as the rings separate; and (e) a trench closer located behind the seed placement discs for closing the trench and compacting the soil over the planted seeds.

The seed planter of this invention plants seeds at a very accurate interval and enables the seed planter to be pulled at greater speeds through the field.

DETAILED DESCRIPTION OF THE INVENTION

Figure 1:
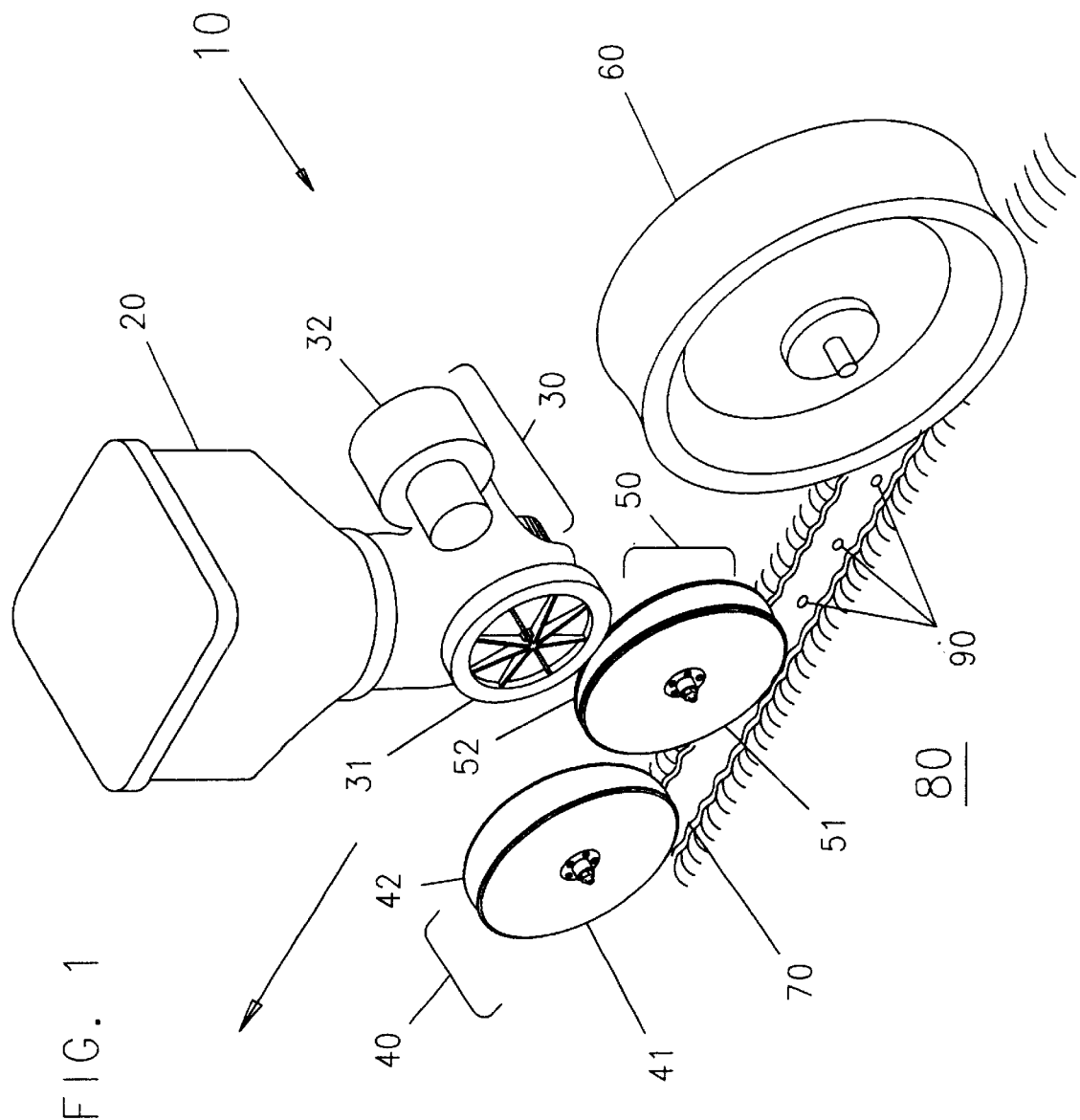
FIG. 1 is a perspective view of a preferred embodiment of the seed planter of this invention.

This invention is best understood by reference to the drawings. In FIG. 1, an individual planter unit of the preferred embodiment of the seed planter 10 of this invention is shown. Many conventional parts, including the frame and various mounting brackets, are omitted for clarity. The seed planter contains a seed hopper 20, a seed meter 30 including a rotary disc 31 and a blower 32, a trench former 40 including a pair of rotating trench forming discs 41 and 42, a seed conveyor 50 including a pair of rotating seed placement discs 51 and 52, and a trench closer consisting of a soil packing wheel 60. The arrow indicates the direction of travel of the seed planter. It can be seen that the trench forming device creates a trench 70 in the soil 80, into which seeds 90 are deposited. The trench is closed by the action of the soil packing wheel. The seed conveyor of this invention is unique. It includes rotating seed placement discs which replace the seed drop chute that is used in conventional seed planters. All the components of the seed planter are conventional and are well known in the art.

Figure 2:
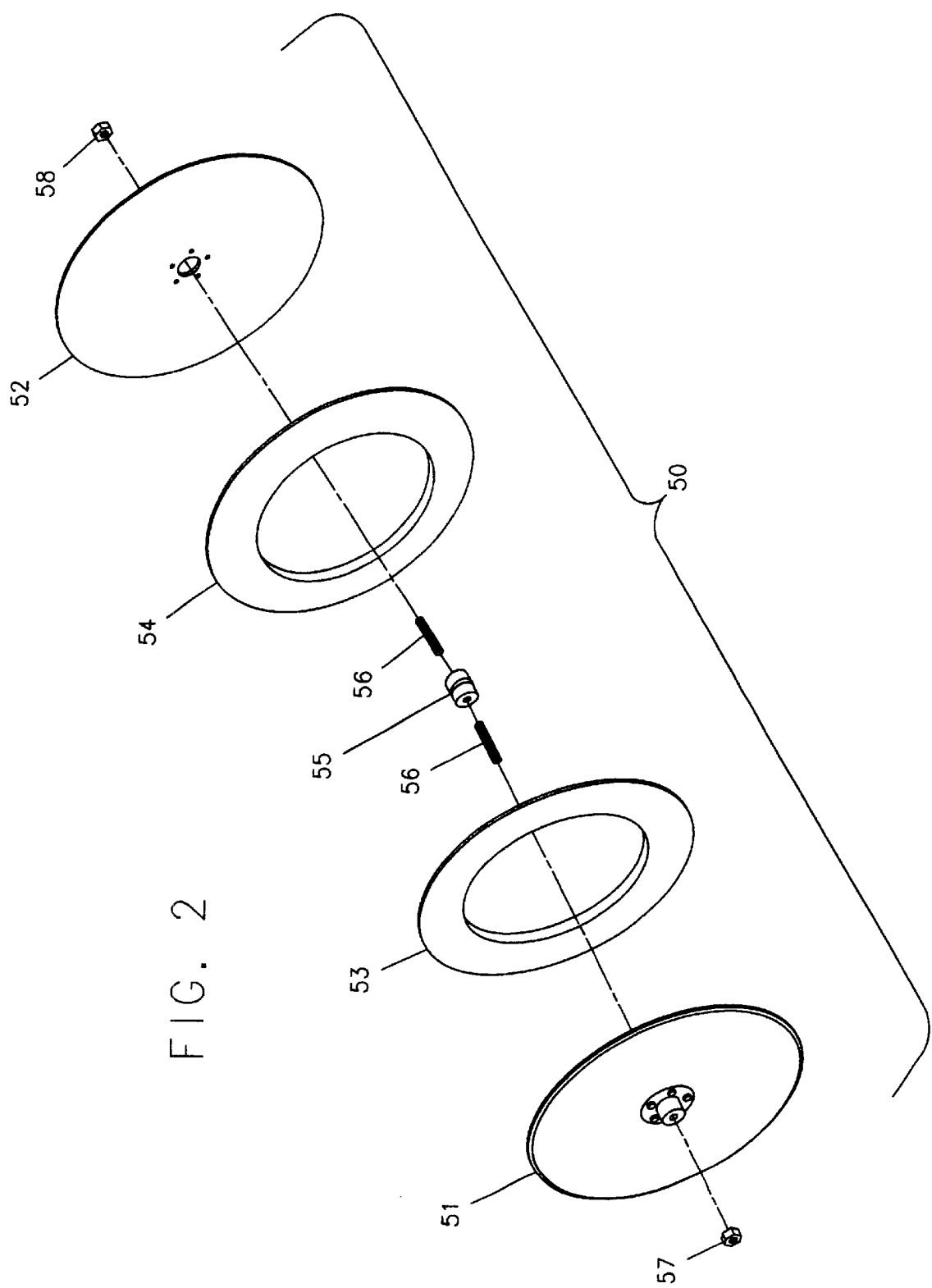
FIG. 2 is an exploded perspective view of the seed placement discs thereof.
Figure 3:
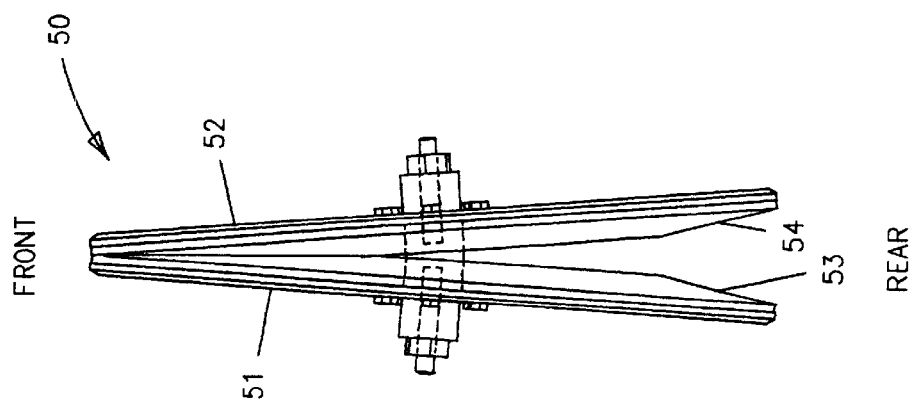
FIG. 3 is a top plan view thereof.

The seed conveyor of this invention is shown in detail in FIGS. 2 and 3. The seed conveyor contains rotating seed placement discs 51 and 52 which are preferably similar in size and construction to conventional trench forming discs. The discs are made of a strong and durable material, such as metal, plastic, or the like, that can withstand the use. The diameter of the discs affects the rotation speed and is generally between about ten and thirty inches. The discs are preferably about fifteen inches in diameter and are made of steel.

Attached to the inner facing sides of the discs are annular rings 53 and 54. The annular rings have an outside diameter equal to or slightly less than the diameter of the discs. The annular rings are made of a resilient material, such as a high density foam, rubber, and the like. The rings generally have a width (the difference between their outside and inside diameters) of about one to six inches, preferably about two inches, and a thickness of about one-fourth to one inch, preferably three-eighths inches. As best seen in FIG. 3, the annular rings are also preferably beveled along their outside edges. In other words, the rings are tapered with the thicker portion along the inside diameter.

The seed placement discs are positioned together so the rings are compressed together during a portion of their rotation below the seed meter and are spaced apart at a later portion of their rotation. This positioning enables a seed dropping from the seed meter to be secured between the compressed rings and to then be released to drop into the underlying trench as the rings separate. The seed placement discs are preferably positioned together in a V orientation as best seen in FIG. 3. The V orientation is created by the curved spacer 55. The discs are fastened by bolts 56 and nuts 57 and 58 onto mounting brackets (not shown) of the seed planter. In the case of the trench forming discs, the bottom of the V is located at about the 5 o'clock position (when viewed from the clockwise rotation side). In other words, the point at which the discs are closest to each other is at the leading edge where the discs engage the soil. In contrast, the seed placement discs are positioned so the bottom of the V is at about the 3 o'clock position (when viewed from the clockwise rotation side). Alternatively, the seed placement discs are positioned parallel to each other and are compressed and/or separated during rotation by external rollers, guides, or the like.

The seed placement discs rotate as the seed planter moves. The discs are preferably freely rotatable so that they rotate by contact with the ground. Alternatively, the seed placement discs are rotated by a drive mechanism. For example, a gauge wheel or the drive mechanism that rotates the seed meter can be coupled by chains, belts, pulleys, or the like to also rotate the seed placement discs.

Figure 4:
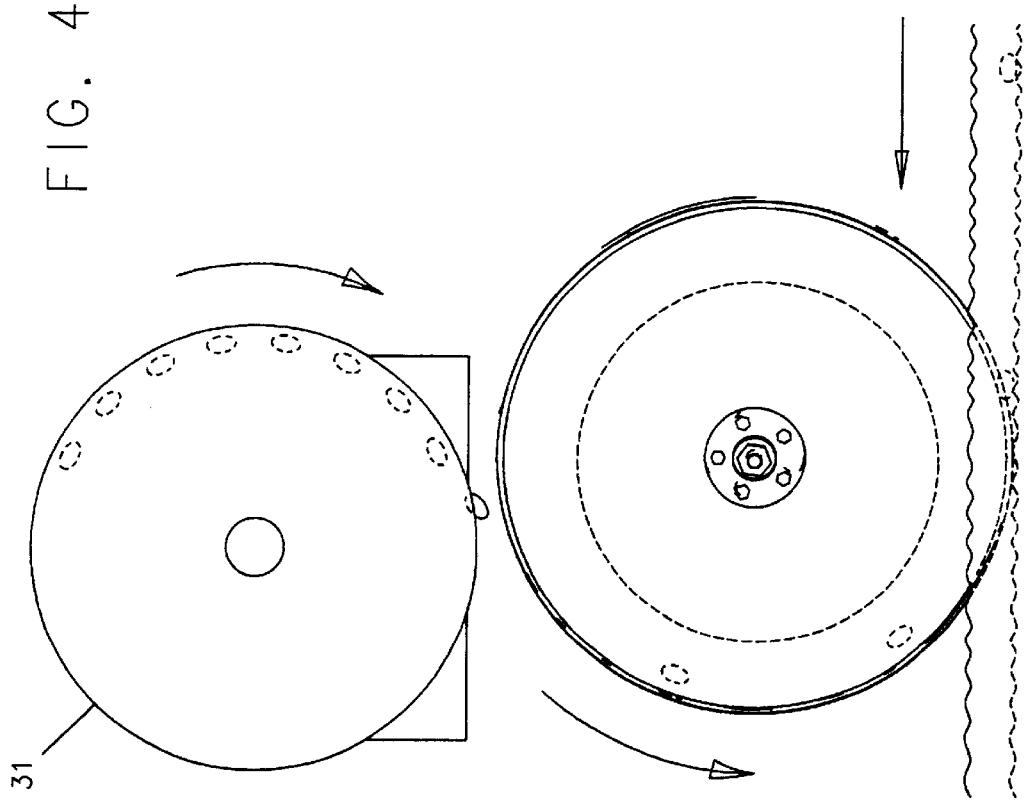
FIG. 4 is an elevation view showing the movement of seeds from a seed meter to the seed placement discs and to the soil during planting.

The operation of the seed conveyor of this invention can now be considered by referring to FIG. 4. The rotary seed meter drops (or propels) seeds to the seed conveyor at regular intervals. When a seed drops down from the meter to the seed conveyor, it is caught between the annular rings at about the 1 o'clock position. The seed placement discs rotate along the ground as the seed planter moves through the field. It is desirable to minimize the "slip" between the seed placement discs and the ground. In other words, it is desirable that the circumferential distance of rotation nearly equal the linear distance traveled. As the seed placement, discs rotate, the seed is held and compressed between the rings, reaching its maximum compression at about the 3 o'clock position. From this point, the seed placement discs begin to separate. The separation becomes sufficient at about the 5 to 6 o'clock position to allow the seed to drop softly into the trench without bouncing. If the seed does not drop by the 6 o'clock position, it may have a forward or upward trajectory that reduces the accuracy of the seed placement.

It can be noted that, in FIG. 4, the direction of rotation of the rotary seed meter is opposite that of the seed placement discs and that the axes of the seed placement discs are slightly behind the axis of the rotary seed meter. These are matters of choice. The direction of rotation of the rotary seed meter can be the same as or opposite that of the seed placement discs. Furthermore, the axes of the seed placement discs can be ahead (as shown in FIG. 1), directly below, or behind the axis of the rotary seed meter.

The seed placement discs enable seeds to be planted at very accurate intervals. This, in turn, enables the seed planter to be pulled at greater speeds through the field. The seed placement discs are suitable for use with most types of seeds, including corn, soybeans, vegetables, etc. It is understood that the preferred spacing between the discs depends upon the size of the seed being planted. As the size of the seed increases, the preferred spacing increases as well.

I claim:

1. A seed planter of the type that is pulled behind a tractor and that deposits seeds into an underlying trench in soil, the seed planter comprising:
   (a) a seed hopper for holding a quantity of seeds;
   (b) a seed meter for metering the flow of seeds to be planted which drops seed into a seed conveyor;
   (c) a trench former for forming an underlying trench in the soil;
   (d) a seed conveyor comprising a pair of rotating seed placement discs located behind the trench former for conveying seeds from the seed meter into the trench at regular intervals, the seed placement discs having resilient annular rings attached to the perimeter of their inner facing sides, the rings being compressed together during a portion of their rotation below the seed meter and being spaced apart at a later portion of their rotation, such that a seed dropping from the seed meter is secured between the compressed rings and is then released to drop into the underlying trench as the rings separate; and
   (e) a trench closer located behind the seed placement discs for closing the trench and compacting the soil over the planted seeds.

2. The seed planter of claim 1 wherein the seed placement discs are positioned in a V orientation with the bottom of the V being located at about the 3 o'clock position when viewed from the clockwise rotation side.

3. The seed planter of claim 2 wherein the resilient rings have beveled outside edges.

4. The seed planter of claim 3 wherein the seed placement discs are freely rotatable.

5. The seed planter of claim 4 wherein the resilient rings are made of foam.

6. A seed planter of the type that is pulled behind a tractor and that deposits seeds into an underlying trench in soil, the seed planter comprising:
   (a) a seed hopper for holding a quantity of seeds;
   (b) a seed meter for metering the flow of seeds to be planted which drops seed into a seed conveyor;
   (c) a trench former for forming an underlying trench in the soil;
   (d) a seed conveyor comprising a pair of rotating seed placement discs located behind the trench former and positioned in a V orientation for conveying seeds from the seed meter into the trench at regular intervals, the seed placement discs having resilient annular rings attached to the perimeter of their facing sides, the rings being compressed together at the bottom of the V and being spaced apart at the top of the V, the bottom of the V being located at about the 3 o'clock position when viewed from the clockwise rotation side, such that a seed dropping from the seed meter is secured between the rings until about the 5 o'clock position when the rings begin to separate and the seed drops into the underlying trench; and
   (e) a trench closer located behind the seed placement discs for closing the trench and compacting the soil over the planted seeds.

7. The seed planter of claim 6 wherein the trench former comprises a pair of rotating trench forming discs positioned in a V orientation for forming a V-shaped underlying trench in the soil.

8. The seed planter of claim 7 wherein the trench closer comprises a soil packing wheel.

9. The seed planter of claim 8 wherein the seed placement discs are freely rotatable.

10. The seed planter of claim 9 wherein the resilient rings are made of foam.

11. A seed conveyor for a seed planter of the type having a seed hopper for holding a quantity of seeds, a seed meter for metering the flow of seeds to be planted which drops seed into a seed conveyor, a trench former for forming an underlying trench in the soil, and a trench closer located behind the seed placement discs for closing the trench and compacting the soil over the planted seeds, the seed conveyor comprising a pair of rotating seed placement discs located behind the trench former for conveying seeds from the seed meter into the trench at regular intervals, the seed placement discs having resilient annular rings attached to the perimeter of their inner facing sides, the rings being compressed together during a portion of their rotation below the seed meter and being spaced apart at a later portion of their rotation, such that a seed dropping from the seed meter is secured between the compressed rings and is then released to drop into the underlying trench as the rings separate.

12. The seed conveyor of claim 11 wherein the seed placement discs are positioned in a V orientation with the bottom of the V being located at about the 3 o'clock position when viewed from the clockwise rotation side.

13. The seed conveyor of claim 12 wherein the seed placement discs are freely rotatable.

14. The seed conveyor of claim 13 wherein the resilient rings have beveled outside edges.

15. The seed conveyor of claim 14 wherein the resilient rings are made of foam.

* * * * *